US008565792B1

(12) United States Patent
Vargantwar et al.

(10) Patent No.: US 8,565,792 B1
(45) Date of Patent: Oct. 22, 2013

(54) DYNAMIC PAGING CONCATENATION

(75) Inventors: Sachin R. Vargantwar, Overland Park, KS (US); Siddharth S. Oroskar, Overland Park, KS (US); Deveshkumar N. Rai, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 758 days.

(21) Appl. No.: 12/699,273

(22) Filed: Feb. 3, 2010

(51) Int. Cl.
*H04W 68/02* (2009.01)
*H04W 72/00* (2009.01)
*H04B 7/00* (2006.01)
*H04H 20/71* (2008.01)

(52) U.S. Cl.
USPC ............ 455/458; 455/453; 455/515; 370/312

(58) Field of Classification Search
USPC ............................. 455/453, 515, 458; 370/312
See application file for complete search history.

(56) References Cited

U.S. PATENT DOCUMENTS

| 5,537,100 | A | * | 7/1996 | Hallberg | 340/7.38 |
|---|---|---|---|---|---|
| 6,058,308 | A | * | 5/2000 | Kallin et al. | 455/432.3 |
| 6,539,003 | B1 | * | 3/2003 | Agarwal et al. | 370/324 |
| 6,731,943 | B1 | * | 5/2004 | McCormick et al. | 455/458 |
| 7,499,418 | B2 | * | 3/2009 | Oprescu-Surcobe et al. | 370/311 |
| 8,203,963 | B1 | * | 6/2012 | Oroskar et al. | 370/252 |
| 8,355,740 | B1 | * | 1/2013 | Oroskar et al. | 455/458 |
| 2002/0123365 | A1 | * | 9/2002 | Thorson et al. | 455/524 |
| 2002/0197992 | A1 | * | 12/2002 | Nizri et al. | 455/435 |
| 2004/0131075 | A1 | * | 7/2004 | Sinnarajah et al. | 370/431 |
| 2006/0068802 | A1 | * | 3/2006 | Benco et al. | 455/452.1 |
| 2006/0251033 | A1 | | 11/2006 | Oprescu-Surcobe et al. | |
| 2007/0153719 | A1 | * | 7/2007 | Gopal | 370/328 |
| 2008/0130609 | A1 | * | 6/2008 | Lee et al. | 370/342 |
| 2008/0268877 | A1 | * | 10/2008 | Harris | 455/458 |
| 2009/0129265 | A1 | * | 5/2009 | Ye et al. | 370/230 |
| 2009/0181701 | A1 | * | 7/2009 | Willey et al. | 455/458 |
| 2011/0019721 | A1 | * | 1/2011 | Diener et al. | 375/219 |
| 2011/0151884 | A1 | * | 6/2011 | Zhao | 455/452.1 |

\* cited by examiner

Primary Examiner — Matthew Sams (57) ABSTRACT

Methods and systems for managing paging-channel resources, and in particular, dynamically adjusting the page-concatenation level based on PCO in a sector, are disclosed herein. An exemplary method involves (a) at an access network configured to page mobile stations via a paging channel of a sector in the access network, determining a paging channel occupancy (PCO) level for the sector; (b) using the determined PCO level as a basis for selecting a page-concatenation level to be used to page mobile stations in the sector, wherein the page-concatenation level is selected from a plurality of available page-concatenation levels; and (c) applying concatenation to pages to mobile stations in the sector according to the selected page-concatenation level.

19 Claims, 6 Drawing Sheets

| Paging Channel Occupancy | Page-Concatenation Level (pages/timeslot) |
| --- | --- |
| 0 – 70% | 1 |
| 70 – 80% | 2 |
| 80 – 90% | 4 |
| 90 – 100% | 8 |

DYNAMIC PAGING CONCATENATION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which mobile stations can send "access probes" seeking to originate calls (e.g., voice calls, data sessions, and/or other "calls") or seeking to register their presence in the sector. Further, each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call.

If a base station has numerous such messages to send, however, the paging channel can become congested, which may delay call setup or even result in a page not reaching the intended mobile station. Accordingly, in a further aspect of existing CDMA access networks, base station commonly group a certain number of pages (that are typically intended for different mobile stations) into a common page message for transmission via the paging channel. Furthermore, to conserve bandwidth, and so that more pages can be transmitted per timeslot, each page in a page message may be concatenated.

OVERVIEW

Concatenating pages so that they can be included in a common page message has certain drawbacks. For example, since some information is inevitably lost through concatenation, the probability of a mobile station receiving a page may decrease due to concatenation of the page. This may be particularly problematic when paging channel resources are being heavily utilized, and congestion on the paging channel therefore increases the probability that a page will not reach the intended mobile station.

Accordingly, methods and systems are provided herein to dynamically adjust the page-concatenation level (e.g., how much concatenation is performed on a page, if any) based on the paging channel occupancy (PCO) in a sector. For instance, in an exemplary embodiment, a base station may determine the PCO in a sector, and select a page-concatenation level to be used for pages in the sector accordingly, typically applying more concatenation to pages when the PCO is lower, and vice versa. In a basic form, this may involve disabling and enabling concatenation of page messages, depending upon whether the PCO is above or below a threshold PCO, respectively.

In one aspect, a method for managing paging-channel resources is disclosed. The method involves (a) at an access network configured to page mobile stations via a paging channel of a sector in the access network, determining a paging channel occupancy (PCO) level for the sector; (b) using the determined PCO level as a basis for selecting a page-concatenation level to be used to page mobile stations in the sector, wherein the page-concatenation level is selected from a plurality of available page-concatenation levels; and (c) applying concatenation to pages to mobile stations in the sector according to the selected page-concatenation level.

In a further aspect, another method for managing paging-channel resources is disclosed. The method involves (a) at an access network configured to page mobile stations via a paging channel of a sector in the access network, determining a paging channel occupancy (PCO) level for the sector; (b) if the determined PCO level is below a threshold PCO, then concatenating pages to mobile stations in the sector; and (c) if the determined PCO level is above a threshold PCO, then refraining from concatenating pages to mobile stations in the sector.

And in a further aspect, a system configured to manage paging-channel resources in an access network is disclosed. The system comprises (a) at least one processor; (b) data storage; and (c) program logic stored in the data storage and executable by the at least one processor to: (i) determine a paging channel occupancy (PCO) level of a paging channel in a sector in the access network; (ii) use the determined PCO level as a basis for selecting a page-concatenation level to be used to page mobile stations in the sector, wherein the page-concatenation level is selected from a plurality of available page-concatenation levels; and (iii) cause the access network to page to mobile stations in the sector according to the selected page-concatenation level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Referring to the drawings, as noted above, FIG. 1 is a simplified block diagram of a wireless communication network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

Figure 1:
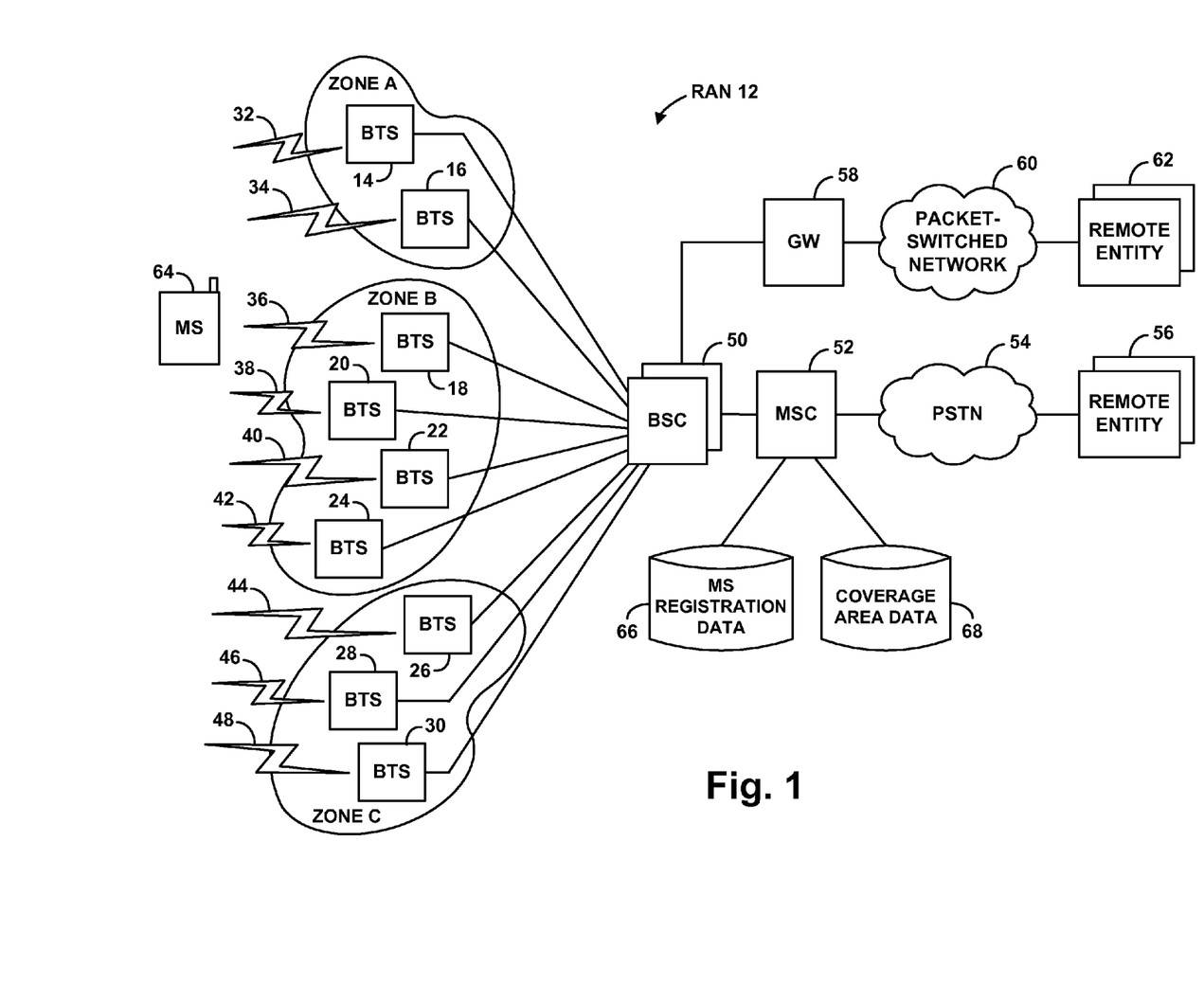
FIG. 1 is a simplified block diagram of a wireless communication network in which exemplary methods and systems can be implemented.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1 xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

Each base station controller may be coupled with one or more switches, such as a mobile switching center (MSC) 52, which provides connectivity with the public switched telephone network (PSTN) 54, so that served mobile stations can communicate with remote entities 56 on the PSTN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

When RAN 12 seeks to page a mobile station 64 (e.g., for an incoming call or for some other reason), a switch, such as MSC 52, may send a page to numerous base stations in the switch's coverage area, such as BTSs 18-24, with the hope that when the base stations broadcast the page message, the mobile station will receive the page message in one of the associated sectors, and will respond. Given the scarcity of paging channel resources, however, most modern cellular networks are instead arranged to engage in a more targeted paging process known as "zone-based paging."

With zone-based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a mobile station. In particular, the network may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones), although it is possible that a third attempt may be of a different scope as well.

As shown in FIG. 1, the base stations are grouped into zones A, B, and C to facilitate zone-based paging as described above. In particular, each base station may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data 66 may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database 70 that is accessible via the MSC 52. Still alternatively, the data may be stored internally at the MSC and/or base stations, or elsewhere in some other form.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted herein for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. Yet further, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein.

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2A:
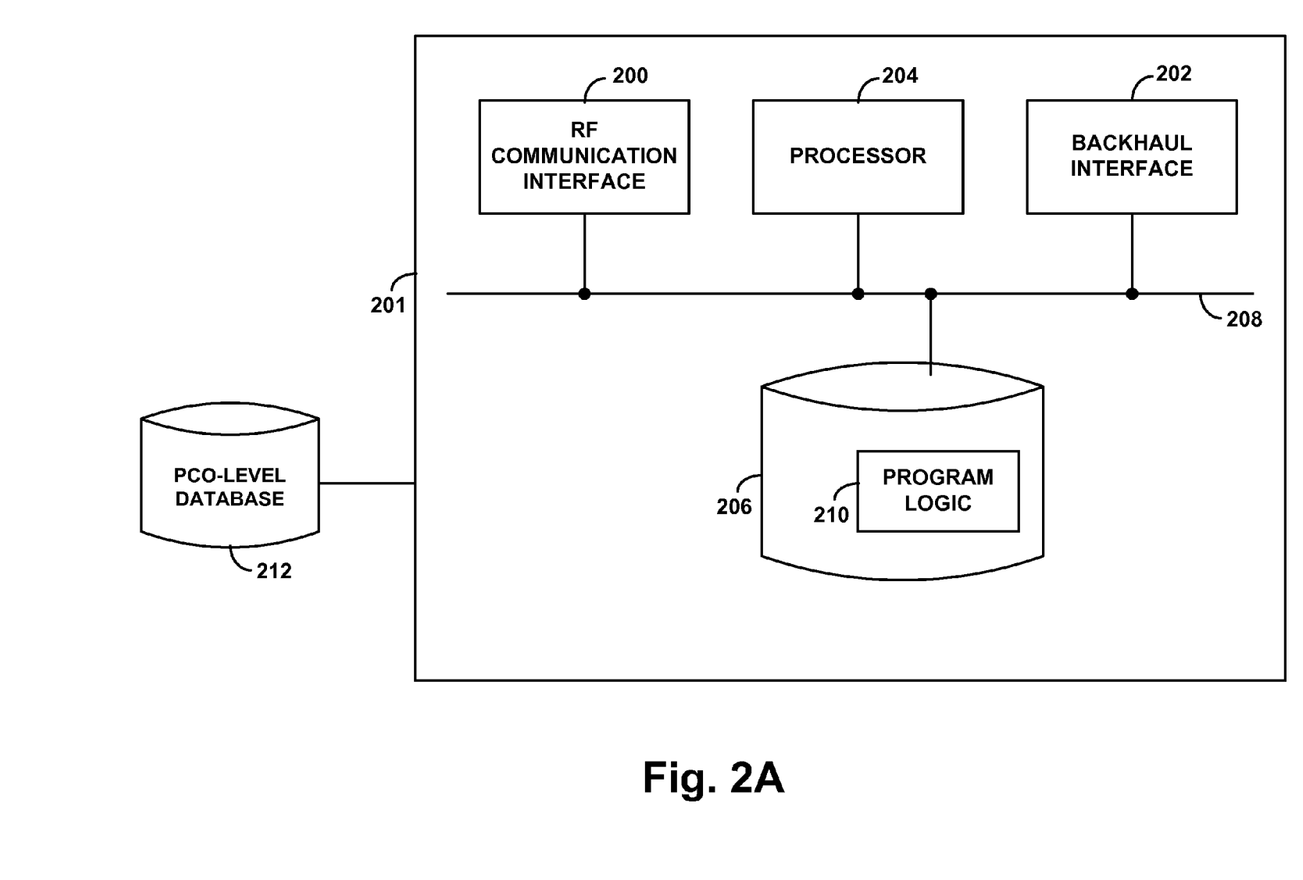
FIG. 2A is a simplified block diagram showing functional components of a system configured to help manage paging-channel resources in an access network, according to an exemplary embodiment.

FIG. 2A is a simplified block diagram showing functional components of a system configured to help manage paging-channel resources in a RAN (i.e., usage of paging-channel bandwidth), according to an exemplary embodiment. In the embodiment shown in FIG. 2, the system is shown as taking the form of a base station 201. As shown, the base station 201 includes an RF communication interface 200, a backhaul interface 202, a processor 204, and data storage 206, all of which may be communicatively linked together by a system bus, network, or one or more other connection mechanisms 208.

In practice, a base station, such as base station 201 may be considered to include one or more BTS and/or a BSC, such as BTSs 18-24 and/or BSC 50 for instance, and base station 201. Accordingly, the illustrated components of base station 201 (e.g., communication interface 200, a backhaul interface 202, a processor 204, and data storage 206) may be distributed and/or subdivided between one or more BTSs and/or a BSC, or may be implemented in a single BTS or single BSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In base station 201, RF communication interface 200 may comprise one or more antenna structures, one or more power amplifiers, and associated equipment, for engaging in RF communication with mobile stations operating within the base station's coverage, according to one of the air interface protocols noted above for instance. Backhaul interface 202 may comprise any sort of communication link or mechanism enabling the base station to exchange signaling and bearer data with other RAN entities, such as with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204. As further shown, data storage 206 preferably contains program logic 210 (e.g., machine language instructions) executable by processor 204 to carry out various functions, such as the functionality of the exemplary methods and systems described herein.

In a further aspect, a RAN, and in particular, an exemplary base station 201 working with an exemplary MSC, may be configured to page one or more mobile stations by generating and transmitting a page message over one or more paging channels. In an exemplary embodiment, an access network will typically receive an indication that a mobile station should be paged (e.g., an incoming call) or may itself determine that a mobile station should be paged. An incoming call notification typically provides the access network with an identifier of the mobile station, such as a MIN or IMSI. The base station may then use the MIN or IMSI as a basis to determine the carrier air interface (CAI) transmit address fields, and encode these fields into a page record, which may then be placed in a page message for transmission in the zone in which the mobile station is registered (and possibly other zones as well). Additional details of this process are well known in the art, and thus not discussed in detail herein.

Further, an exemplary base station may be configured to create a page message that includes multiple pages, such that multiple mobile stations can be paged using a single page message. (For clarity, each individual page to a mobile station that is included in a larger "page message" may be referred to as "page record.") Before transmission, page records may be concatenated so that more page records may be included in a page message than otherwise could be. For example, in some implementations, at least eight page records may be concatenated in a single General Page Message (GPM). Alternatively, in other implementations, at least five page records may be concatenated in a single GPM. Other concatenation techniques are also possible.

Without concatenation, a single page message that occupies two half frames in the paging channel, typically cannot include more than four page records. In comparison, provide for concatenation such that a GPM in which two page records are concatenated can be sent in two to three half frames, which allows for at least five page records to be sent in a single timeslot. Applying additional concatenation, a GPM in which two to eight page records can be concatenated and sent in two half frames, which allows a base station to transmit eight page records in a timeslot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff since more page records are being concatenated into the same 80 ms slot. Thus, while concatenating page records into a GPM may reduce the load on the paging channel, thereby helping to reduce paging channel occupancy (PCO), concatenation may also result in some page records failing to reach their intended mobile stations, thus reducing the paging-success rate (PSR). In practice, a two to three percent decrease in the PSR has been observed.

Further, while concatenation may help reduce PCO, the PCO level may still reach higher levels, and when the PCO is higher, the decline in PSR may be exacerbated, as congestion on the paging channel may result in pages not reaching their intended mobile stations. For example, in practice it has been observed that when the PCO reaches 70%, pages are shed (i.e., don't reach the mobile station) and the PSR may to approximately 95%. When the PCO reaches 80% the PSR typically fall further to approximately 93%. And when the PCO reaches 90% the PSR typically falls even further to approximately 90%. It should be understood that this is but one example, and the specific relationship between the PCO and the PSR may vary, without departing from the scope of the invention.

According to an exemplary embodiment, a network entity or entities, such as a base station 201, may be configured to vary the level of concatenation used for pages to mobile stations in a given sector. For example, a base station may be configured to create and/or transmit GPMs in which varying amounts of concatenation are applied to page records, and to selectively include a given page record in a GPM having a selected level of concatenation. In addition, a base station may be configured to send a page record in a page message without concatenating the page record.

In particular, an exemplary system dynamically select a page-concatenation level to use for paging, and include page record in a GPM having the selected page-concatenation level (i.e., apply concatenation to each page record according to the selected page-concatenation level). For example, in exemplary base station 201, program logic 210 may be executable by processor 204 to (i) determine the PCO of a paging channel in a given sector, (ii) use the determined PCO as a basis for selecting a page-concatenation level from a plurality of available page-concatenation levels, and (iii) cause the access network to page mobile stations in the sector according to the selected page-concatenation level. In basic form, the selection of a page-concatenation level may a binary choice between concatenating a page record and not concatenating a page record. Alternatively, the page-concatenation level may be selected from multiple possible page-concatenation level corresponding to varying degrees of concatenation. The selection may be implemented using other techniques as well.

In a further aspect, base station 201 may include or have access to a PCO-level database 212. PCO-level database may include a database entry for the sector that indicates the most-recently measured PCO in the sector. Accordingly, the base station 201 may be configured, when it determines or receives an indication that a mobile station should be paged, to query the PCO-level database 212 to obtain the PCO for the sector in which the mobile station is located. Further, PCO-level database 212 may include data mapping particular PCO levels or ranges of PCO levels to corresponding page-concatenation levels. Accordingly, before base station 201 pages a mobile station, the base station 201 may query PCO-level database 212 to retrieve the page-concatenation level to use for the page, in addition or in the alternative to the PCO.

Figure 2B:
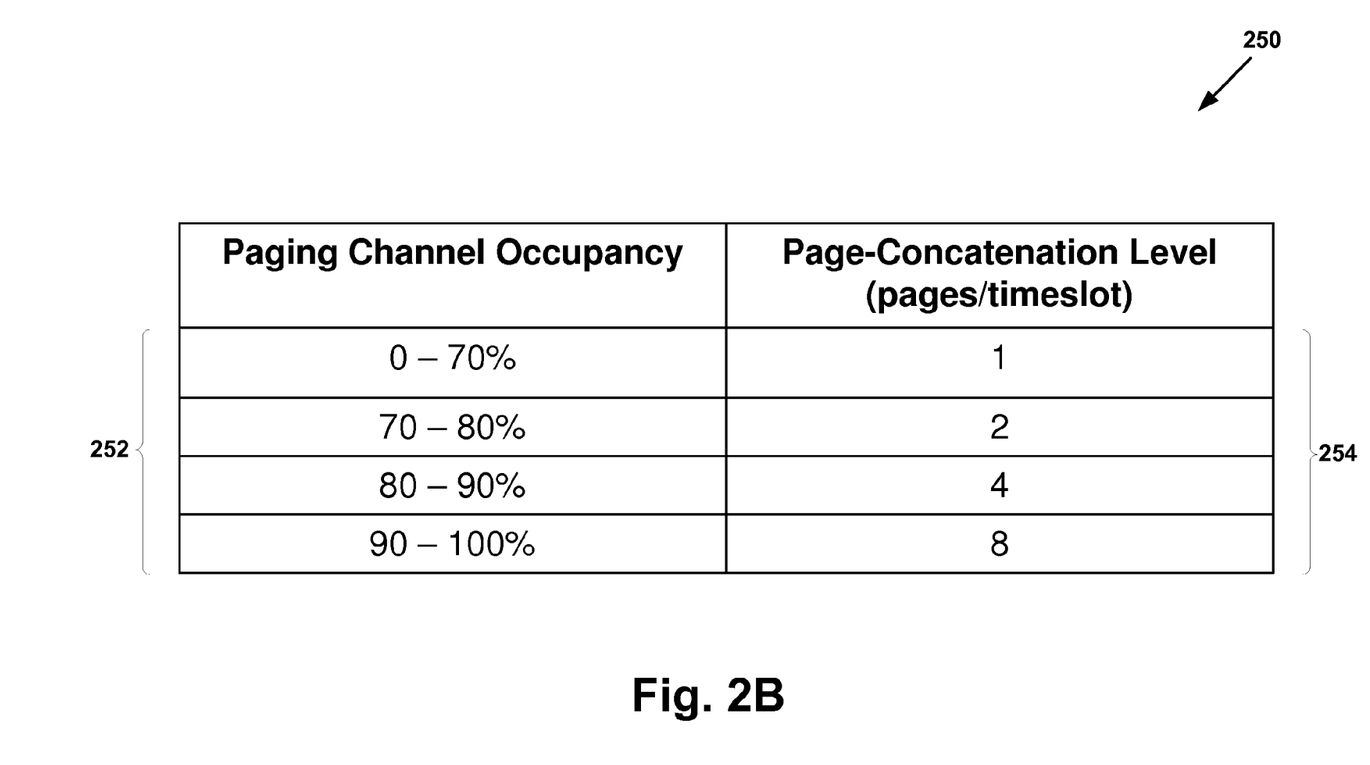
FIG. 2B is a table illustrating an exemplary paging channel occupancy level database, according to an exemplary embodiment.

In a further aspect, base station 201 may be configured to maintain or update the PCO-level database by periodically determining the PCO in each sector served by the base station, and storing the determined PCO levels in the database entries corresponding to the respective sectors. The base station may also be configured to access the data mapping particular PCO levels or ranges of PCO levels to corresponding page-concatenation levels to determine the page-concatenation level for the sector, and then store data indicating the determined page-concatenation level in the PCO-level database 212. FIG. 2B is a table 250 illustrating an exemplary PCO-level database, which indicates for ranges 252 of PCO, the corresponding page-concatenation levels 254. In table 250, the page-concatenation levels 254 are measured in pages per timeslot (e.g., for a PCO between 70% and 80%, the base station would apply concatenation so as to include two pages per timeslot). Alternatively, the base station 201 may apply program logic, using the PCO as an input, to calculate a value for a parameter indicating the page-concatenation level.

Figure 3:
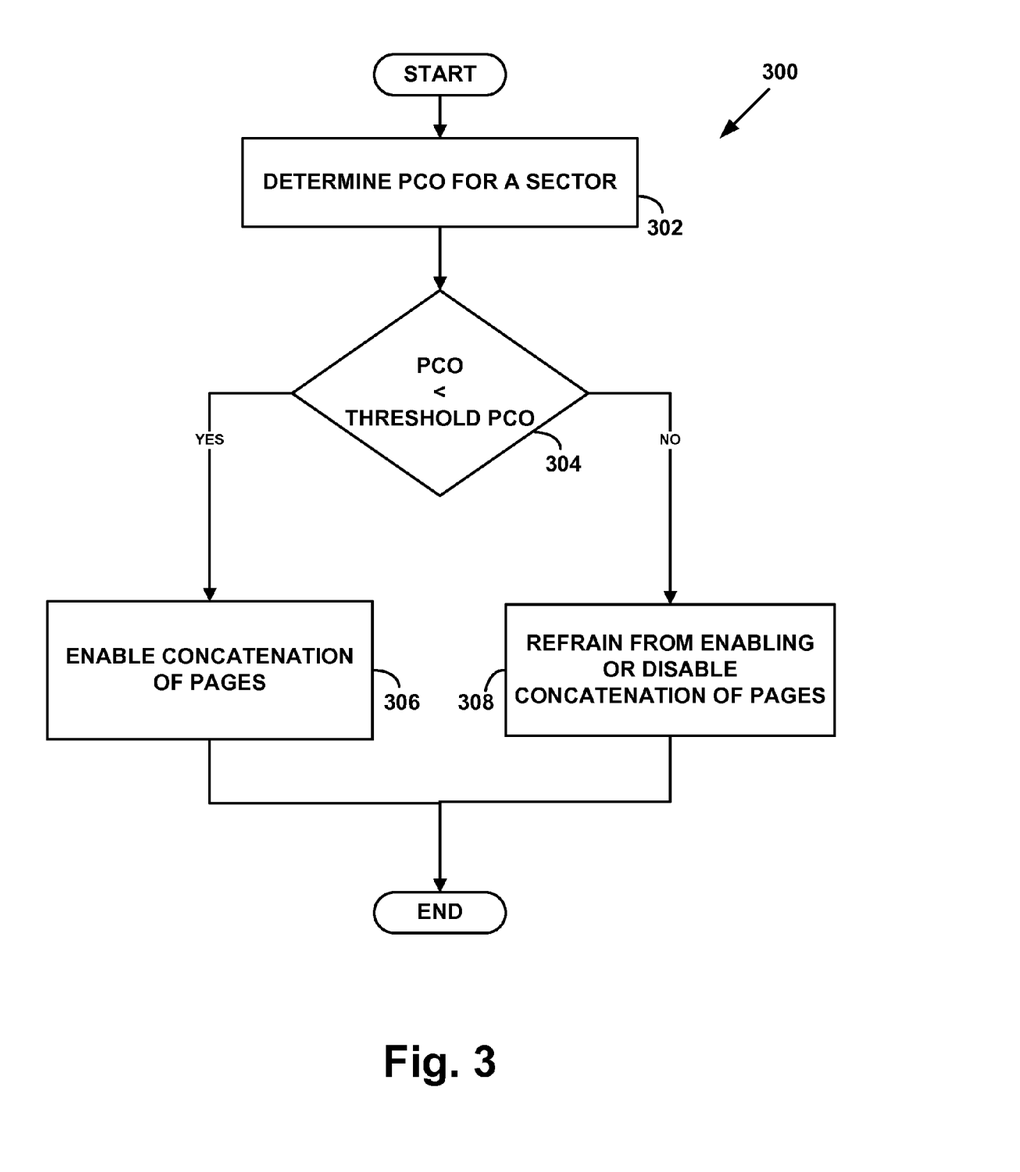
FIG. 3 is a flow chart illustrating a method for managing paging-channel resources, according to an exemplary embodiment.

FIG. 3 is a flow chart illustrating a method 300 for managing paging-channel resources, according to an exemplary embodiment. Using the method illustrated in FIG. 3, an access network may dynamically enable and disable a concatenation feature in a given sector, depending upon the PCO in the sector. In particular, the method involves a base station determining the PCO for a given sector, as shown by block 302. Then, the base station compares the determined PCO to a threshold PCO, as shown by block 304. If determined PCO level is below a threshold PCO, then the base station concatenates pages to mobile stations in the sector (i.e., enables a concatenation feature), as shown by block 306. On the other hand, if the determined PCO is above the threshold PCO, then the base station refrains from concatenating pages to mobile stations in the sector (does not enable or disables the concatenation feature), as shown by block 308. In general, it should be understood that while method 300, and other exemplary methods, may be described by way of example, with reference to a base station carrying out the method, other access-network entities and/or entities in communication with an access network may be configured to carry out method 300 or portions thereof, without departing from the scope of the invention.

In an exemplary embodiment, method 300 may be repeated periodically so as to dynamically enable and disable concatenation of pages. Furthermore, method 300 may be performed for each sector served by the base station. Yet further, the threshold PCO may differ between sectors served by the base station, as a matter of engineering design choice.

Figure 4:
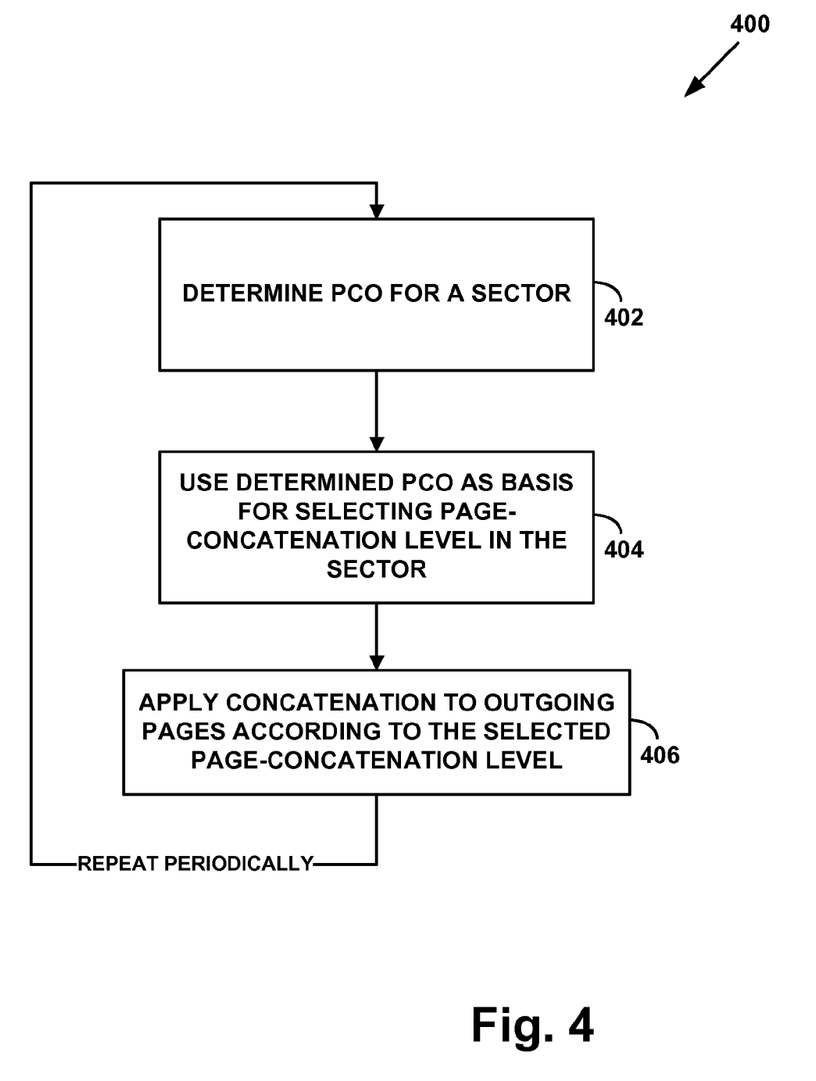
FIG. 4 is another flow chart illustrating a method for managing paging-channel resources, according to an exemplary embodiment.

FIG. 4 is another flow chart illustrating a method 400 for managing paging-channel resources, according to an exemplary embodiment. The method 400 involves the base station determining the PCO level for a given sector, as shown by block 402. The base station then uses the PCO level as a basis for selecting a page-concatenation level to be used to page mobile stations in the sector, as shown by block 404. The page-concatenation level is typically selected from a plurality of available page-concatenation levels. The base station then applies concatenation to outgoing pages according to the selected page-concatenation level, as shown by block 406. Preferably, the base station repeats method 400 periodically, in order to dynamically update the page-concatenation level to account for variations in PCO in the sector. The period with which method 400 is repeated may be selected as a matter of engineering design choice.

In method 400, the step of determining the PCO may be accomplished using various techniques. For example, the PCO may be determined based on the number and/or size of the pages that are scheduled for a given timeslot on the paging channel, as well as the number and/or size any overhead messages (ACK messages, etc.) scheduled for transmission during the timeslot. To do so, the base station may calculate the total bandwidth required for transmission of all the page records in a given timeslot to determine and the total bandwidth required for transmission of all overhead messages in the timeslot. (In practice, overhead messages typically occupy the majority of the available paging-channel bandwidth.) The base station may then calculate the PCO as the sum of the bandwidth totals for page records and overhead messages in the timeslot. This sum, indicating a total usage of paging-channel resources, may then be used as the PCO, or alternatively, the PCO may be calculated as the ratio of the total bandwidth for all pages and overhead messages as compared to the total available bandwidth on the paging channel.

In some embodiments, the PCO may be determined based on pages and overhead messages scheduled for a future timeslot, which is typically the next-occurring timeslot (although later occurring timeslots are also possible). As one specific example, the base station may determine the PCO by adding the total size of the scheduled overhead messages (i.e., the total bandwidth required for transmission) and the total size of the scheduled pages. The PCO may then be calculated as the ratio of this sum as compared to the 1528 bits available in a typical 80 ms paging-channel timeslot (where data is transmitted at 9.6 kb/sec). Alternatively, this sum itself may be considered as the PCO. And as another alternative, this sum may be subtracted from the 1528 bits available to determine how many additional pages may be sent in the timeslot. This determination may be based on the typical page record size of 72 bits (plus addressing bits) for each page record. In some embodiments, once overhead messages are accounted for, eight to ten page records may be included in the GPM.

In other embodiments, step of determining the PCO the may involve determining the historical PCO in a sector. For example, the base station may determine the actual PCO for each timeslot by determining how many pages and overhead messages were actually transmitted (or the total bandwidth actually used to transmit all pages and overhead messages) during the timeslot. In such embodiments, base station may calculate the actual PCO for every timeslot, or do so periodically, with a predetermined number of timeslots between each PCO calculation.

As another example, the determined PCO may be a moving average of the PCO with a window size of a predetermined number of timeslots. For instance, the base station might implement a moving average over the previous ten timeslots. As such, the base station may calculate the actual PCO for each timeslot, and then determine the PCO to be equal to the average of the PCO for the timeslot and the nine immediately preceding timeslots, repeating this process after each timeslot. Alternatively, the base station may determine an average PCO periodically, for example, calculating the average PCO over ten timeslots once every ten timeslots. Other techniques for determining the PCO are also possible.

The step of using the determined PCO to select a page-concatenation level may also be accomplished using various techniques. In an exemplary embodiment, a page-concatenation level is typically selected such that less concatenation is applied to pages when the PCO level is higher and more concatenation is applied to pages when the PCO level is lower. For example, if the determined PCO level is above a threshold PCO, then a first page-concatenation level using less concatenation or no concatenation is selected. On the other hand, if the determined PCO level is below the threshold PCO, then a second page-concatenation level applying more concatenation is selected. The threshold PCO may be selected as a matter of engineering design choice. For instance, a threshold PCO of 75% occupancy may be selected, or another PCO may be selected.

Figure 5:
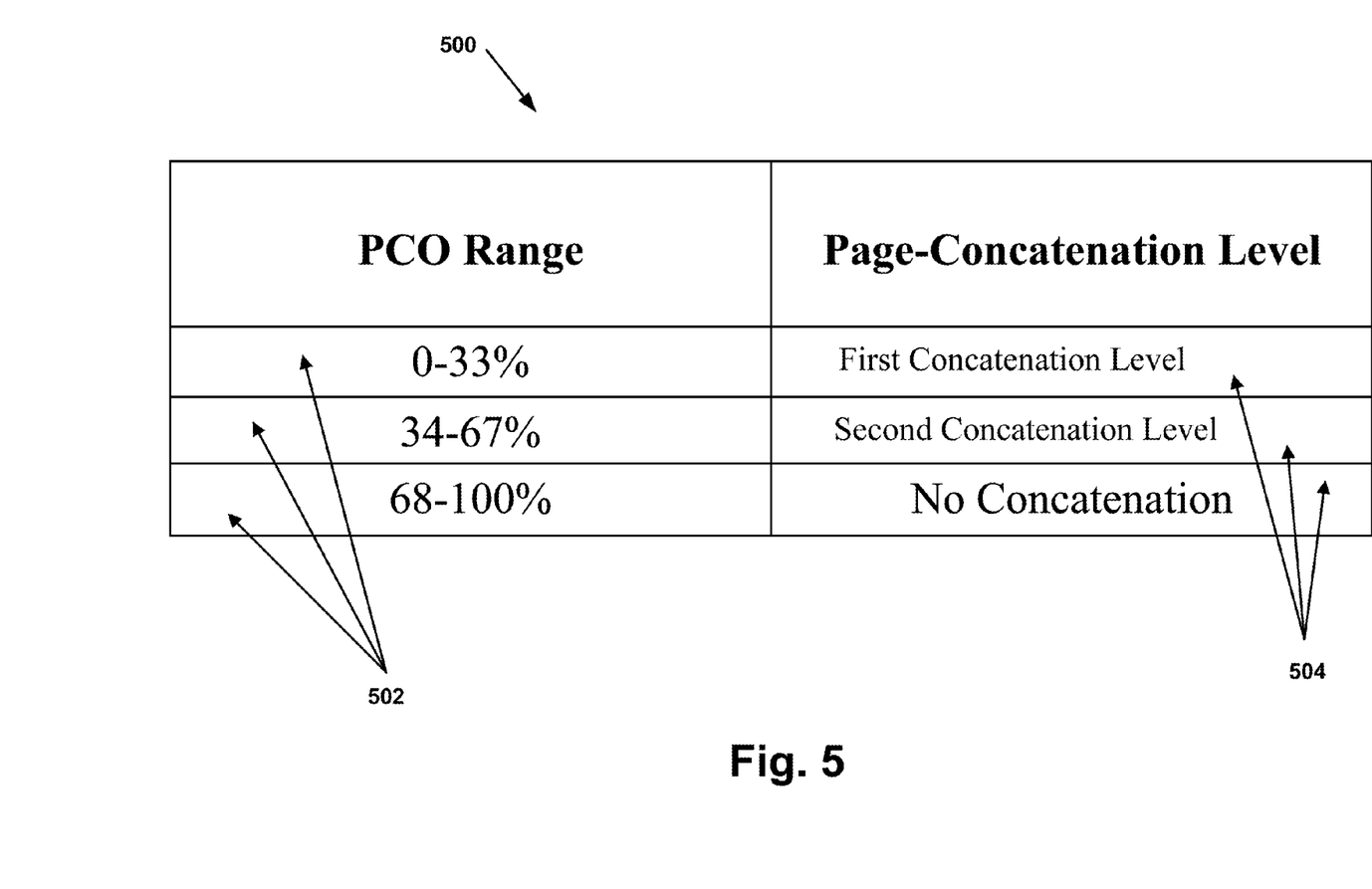
FIG. 5 is a table showing a mapping of paging-channel occupancy ranges to page-concatenation levels, according to an exemplary embodiment

More granular page-concatenation selection schemes may also be implemented. For example, multiple PCO ranges may be defined and/or selection may be from multiple page-concatenation levels such. As a more specific example, FIG. 5 is a table 500 showing a mapping of PCO ranges 502 to page-concatenation levels 504, according to an exemplary embodiment. In FIG. 5, PCO ranges 502 of 0-33%, 34-67%, and 68-100% are defined. As shown PCO levels from 0-33% correspond to a page-concatenation levels as specified by a first concatenation level, PCO levels from 34-67% correspond to a page-concatenation levels as specified by a second concatenation level in which less concatenation is applied to page records in a GPM, and PCO levels from 68-100% correspond no concatenation. It should be understood that in general, ranges of PCO levels and/or the corresponding page-concatenation levels may be selected as a matter of engineering design choice.

Referring again to FIG. 4, method 400 may further involve is preferably repeated periodically in order to dynamically update the page-concatenation level being applied to pages in a given sector. Alternatively, the method 400 may be performed in response to determining that a mobile station needs to be paged. As such, method 400 may further involve determining that a page should be transmitted, and in response, scheduling the page for transmission during a given timeslot in a page message having the selected page-concatenation level, and then transmitting the page message during the timeslot.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for managing paging-channel resources, the method comprising:
   determining, by an access network configured to page mobile stations via a paging channel of a sector in the access network, a paging channel occupancy (PCO) level for the sector;
   the access network using the determined PCO level as a basis for selecting a page-concatenation level to be used to page mobile stations in the sector, wherein the page-concatenation level is selected from a plurality of available page-concatenation levels;
   the access network applying concatenation to a plurality of page records that are directed to a plurality of mobile stations in the sector, wherein concatenation is applied to each of the page records according to the selected page-concatenation level; and
   after concatenating the plurality of page records, transmitting a page message that includes the plurality of page records.

2. The method of claim 1, further comprising periodically performing the method of claim 1, thereby dynamically updating the selected page-concatenation level according to the PCO level in the sector.

3. The method of claim 1, further comprising:
   determining that a page should be transmitted to a first mobile station operating in the sector;
   in response to determining that the page should be transmitted to the first mobile station, transmitting a page record to the first mobile station via the paging channel of the sector, wherein the page record to the first mobile station is transmitted in the page message having the selected page-concatenation level.

4. The method of claim 3, further comprising, in response to determining that the mobile station should be paged, scheduling the page record to the first mobile station for transmission in the page message during a given timeslot.

5. The method of claim 1, wherein determining the PCO level for the sector comprises determining a current amount of bandwidth being used on the paging channel or an amount of bandwidth already-scheduled for use on the paging channel.

6. The method of claim 1, further comprising:
   maintaining a PCO-level database, wherein the PCO-level database comprises a database entry for the sector, wherein maintaining the PCO-level database comprises:
   periodically performing the step of determining the PCO level for the sector; and
   storing the determined PCO level in the database entry for the sector.

7. The method of claim 6, further comprising:
   determining that the page message should include a page record to a first mobile station operating in the sector; and
   in response to determining that the page message should include the page record to the first mobile station:
   retrieving the selected PCO-level from a PCO-level database; and
   transmitting the page message via the paging channel of the sector.

8. The method of claim 1, wherein determining the PCO level for the sector comprises determining usage of the paging channel for pages to mobile stations.

9. The method of claim 8, wherein determining the PCO level for the sector further comprises determining usage of the paging channel for overhead messages.

10. The method of claim 1, wherein determining the PCO level for the sector comprises determining (a) a current PCO level in the sector or (b) an average PCO level in the sector over a predetermined period of time.

11. The method of claim 1, wherein the plurality of available page-concatenation levels comprises at least a first page-concatenation level and a second page-concatenation level, wherein the first page-concatenation level is no concatenation and the second page-concatenation level involves at least some concatenation of pages, and wherein using the determined PCO level as a basis for selecting a page-concatenation level to be used to page mobile stations comprises:
   if the determined PCO level is above a threshold PCO, then selecting the first page-concatenation level; and
   if the determined PCO level is below a threshold PCO, then selecting the second page-concatenation level.

12. The method of claim 1, wherein using the determined PCO level as a basis for selecting a page-concatenation level to be used to page mobile stations comprises selecting the page-concatenation level such that less concatenation is applied to pages when the PCO level is higher and more concatenation is applied to pages when the PCO level is lower.

13. A method for managing paging-channel resources, the method comprising:
   determining, by an access network configured to page mobile stations via a paging channel of a sector in the access network, a paging channel occupancy (PCO) level for the sector;
   if the determined PCO level is below a threshold PCO, then the access network concatenating pages to mobile stations in the sector, wherein concatenating pages to mobile stations in the sector comprises transmitting at least one page message by:
      concatenating a plurality of page records that are directed to a plurality of mobile stations in the sector; and
      after concatenating the plurality of page records, transmitting a page message that includes the plurality of page records; and
   if the determined PCO level is above a threshold PCO, then the access network refraining from concatenating pages to mobile stations in the sector.

14. A system configured to manage paging-channel resources in an access network, the system comprising:
   at least one processor;
   data storage; and
   program logic stored in the data storage and executable by the at least one processor to:
      (i) determine a paging channel occupancy (PCO) level of a paging channel in a sector in the access network;
      (ii) use the determined PCO level as a basis for selecting a page-concatenation level to be used to page mobile stations in the sector, wherein the page-concatenation level is selected from a plurality of available page-concatenation levels;
      (iii) cause the access network to apply concatenation to a plurality of page records that are directed to a plurality of mobile stations in the sector, wherein concatenation is applied to each of the page records according to the selected page-concatenation level; and
      (iv) cause the access network to, after concatenating the plurality of page records, transmit a page message that includes the plurality of page records.

15. The system of claim 14, further comprising program logic stored in the data storage and executable by the at least one processor to periodically perform at least functions (i)-(ii), thereby dynamically updating the selected page-concatenation level according to the PCO level in the sector.

16. The system of claim 14, further comprising program logic stored in the data storage and executable by the at least one processor to maintain a PCO-level database, wherein the PCO-level database comprises a database entry for the sector, wherein the program logic is executable to maintain the PCO-level database by:
   periodically determining the PCO level for the sector and storing the determined PCO level in the database entry for the sector.

17. The system of claim 14, wherein the program logic stored in the data storage and executable by the at least one processor to determine the PCO level for the sector comprises program logic stored in the data storage and executable by the at least one processor to:
   determine usage of the paging channel for pages to mobile stations; and
   determining usage of the paging channel for overhead messages.

18. The system of claim 14, wherein the plurality of available page-concatenation levels comprises at least a first page-concatenation level and a second page-concatenation level, wherein the first page-concatenation level is no concatenation and the second page-concatenation level involves at least some concatenation of pages, and wherein the program logic stored in the data storage and executable by the at least one processor to use the determined PCO level as a basis to select a page-concatenation level to be used to page mobile stations comprises the program logic stored in the data storage and executable by the at least one processor to:
   if the determined PCO level is above a threshold PCO, then select the first page-concatenation level; and
   if the determined PCO level is below a threshold PCO, then select the second page-concatenation level.

19. The system of claim 14, wherein the program logic stored in the data storage and executable by the at least one processor to use the determined PCO level as a basis to select a page-concatenation level to be used to page mobile stations comprises the program logic stored in the data storage and executable by the at least one processor to:
   select the page-concatenation level such that less concatenation is applied to pages when the PCO level is higher and more concatenation is applied to pages when the PCO level is lower.

* * * * *